UNITED STATES PATENT OFFICE.

WILLIAM BLAKE, OF SHARON, OHIO.

IMPROVEMENT IN FIRE AND WEATHER PROOF COMPOSITION OR ARTIFICIAL SLATES.

Specification forming part of Letters Patent No. 5,490, dated March 28, 1848.

*To all whom it may concern:*

Be it known that I, WILLIAM BLAKE, of Sharon, in the county of Medina and State of Ohio, have discovered and applied a new and useful Compound for Paints, Cements, and other Purposes; and I hereby declare that the following is a full, clear, and exact description of the same, together with the manner of compounding and use.

I have discovered an earth composed of the following ingredients: About one-half is silica, one-quarter, or nearly so, is alumina, and smaller proportions of black oxide of iron, sulphuret of iron, lime, and carbon. This material is of a dark color, and is found in a natural state in Sharon, Medina county, Ohio. When taken from the earth it is about the consistence of cold tallow, but upon exposure to the air and sun for several days it becomes hard like a stone. This earth I pulverize finely by grinding and mix it with a drying-oil to about the consistency of thick paint. The process of grinding has been found very difficult, and required many experiments to succeed. I now employ rotary mills of stone or iron, after drying it thoroughly, and without the employment of water or other liquid. When mixed with drying-oil, as above stated, I can apply it with a brush to wood, cloth, paper, or any of the metals as a coating, and while in a green state, before the oil dries, I apply an additional portion of the dry powder thereto by dusting it upon its surface.

To manufacture artificial slate of this substance, I apply a thick coating of the compound to wood or paper, as above described, and then rub the surface down smooth with common pumice-stone.

To make a fire-proof cement for stoves or fire-proof safes of this material, I mix the powder with oil to about the consistence of putty, with which the joints are stopped.

The surfaces covered with the above compound are fire-proof and impervious to water. They can be made to receive a perfect polish on the surface, or the surface may be left suitable for all the purposes of natural slate, and with as little difficulty as with ordinary paints. When thoroughly dry and consolidated it becomes of the consistency of stone or slate.

Having thus fully described my compound, what I claim as my invention, and desire to secure by Letters Patent as my discovery, is—

The new paint or cement, made, substantially as above described, by mixing the above-named earth with drying-oil in suitable proportions to produce the useful results as hereinbefore described.

WM. BLAKE.

Witnesses:
WM. H. BISHOP,
J. J. GREENOUGH.